United States Patent [19]
Ogawa

[11] 4,437,821
[45] Mar. 20, 1984

[54] SHAFT SEAL FOR PUMP MEANS

[75] Inventor: Hitoshi Ogawa, Himeji, Japan

[73] Assignee: Mitsubishi Denki Kabushiki Kaisha, Tokyo, Japan

[21] Appl. No.: 284,538

[22] Filed: Jul. 20, 1981

[30] Foreign Application Priority Data

Jul. 23, 1980 [JP] Japan .............. 55-104401[U]

[51] Int. Cl.³ .................. F04C 15/00; F16J 15/32
[52] U.S. Cl. ............................ 418/104; 277/1; 277/9; 277/152
[58] Field of Search ............. 418/104; 277/1, 9, 9.5, 277/152, 153

[56] References Cited
U.S. PATENT DOCUMENTS
4,114,897 9/1978 Bainard ................... 277/152 X FOREIGN PATENT DOCUMENTS
54-3411079 3/1979 Japan .
51229 10/1941 Netherlands ............. 277/152

Primary Examiner—Leonard E. Smith
Attorney, Agent, or Firm—Wenderoth, Lind & Ponack

[57] ABSTRACT

An eccentric vane pump to be mounted on e.g. an automobile alternating current generator, and having a housing, an annular disc adapted to be fixed to the housing to define a working chamber in association with the housing, a rotor rotatively received within the working chamber and provided with radial vanes slidably mounted therein, a shaft rotatively mounted on the end frame of the generator and adapted to be drivingly connected the rotor through a spline joint with an eccentricity being left between the centers of the shaft and the working chamber, and an oil seal secured to the inner periphery of the disc so as to sealing abut the shaft at its inner periphery to hermetically seal the working chamber. A spacer can be used to insure tight abutment of the oil seal against the shaft.

3 Claims, 8 Drawing Figures

SHAFT SEAL FOR PUMP MEANS

BACKGROUND OF THE INVENTION

The present invention relates to a pump means, and more particularly to an eccentric vane pump to be mounted on an alternating current generator for an automobile, etc.

In general, this kind of eccentric vane pump has a construction as shown in FIGS. 1 to 3 of the attached drawings. In the drawings the reference numeral 1 designates an end frame or bracket of an alternating current generator for an automobile, not shown, 2 a shaft rotatively supported in end frame 1 by means of a bearing 3 and adapted to be driven by the alternating current generator, 2a a splined portion formed on shaft 2 at its free end portion, and 4 a rotor fixedly secured to shaft 2 through a spline coupling with splined portion 2a of shaft 2. Rotor 4 has a number (four in the instant example) of radial slots at equi-angular intervals, each slidably receiving a radial vane 5 therein. A housing 6 has a cylindrical inner peripheral surface the center of which is eccentric to the centers of shaft 2 and rotor 4. An annual disc 7 closes the open end of housing 6 to form a working chamber 8 of the pump in cooperation with shaft 2. A seal means 9 hermetically seals housing 6 relative to disc 7, and an oil seal means 10 is secured to disc 7 at its inner periphery with the inner periphery thereof be in contact with shaft 2 to hermetically seal working chamber 8 relative to the outside. Housing 6 and disc 7 are integrally secured to end frame 1 by means of bolts 11. An inlet port 12, and outlet port 13, and a lubrication orifice 14 are respectively provided in housing 6, inlet port 12, outlet port 13 and lubrication orifice 14 being adapted to be connected to a vacuum tank, an oil pan, and a lubricating pump, respectively, not shown. A protection cap 15 is mounted on splined portion 2a of shaft 2 when the rotor 4 is not mounted thereon for a reason to be explained later.

In operation, upon rotation of shaft 2 in the direction shown by the arrow in FIG. 2, radial vanes 5 slidably disposed within the slots formed in rotor 4 are urged radially outwards owing to the centrifugal force applied thereto by the rotating rotor 4 so as to have their outer end surfaces slide on the inner peripheral surface of housing 6 so that they perform a pump action to suck air from the vacuum tank through inlet port 12 and discharge it through outlet port 13. The lubricant oil fed into housing 6 through lubrication orifice 14 lubricates the relatively shifting surfaces of vanes 5 and the slots formed in rotor 4 and is discharged through outlet port 13 entrained in the discharged air.

In a conventional eccentric vane pump having the construction and operation as described above, since the outer diameter of splined portion 2a of shaft 2 and the inner diameter of the shaft engaging portion of oil seal means 10 formed at its inner periphery are identical, in order that oil seal means 10 be prevented from being injured by splined portion 2a of shaft 2 at the time of assembly of end frame 1 and disc 7 on which oil seal means 10 in mounted at its outer periphery, splined portion 2a of shaft 2 is required to be covered by protection cap 15 as shown in FIG. 3. In addition, owing to this requirement, since it is necessary for rotor 4 and housing 6 to be mounted on shaft 2 after disc 7 on which oil seal means 10 is mounted has been passed over shaft 2, housing 6 and disc 7 cannot be previously assembled as a pump proper secured together by means of pins or the like, so that the simplification of the assembly process is not possible.

In order to obviate this disadvantage, a further example of a conventional vane pump of this type has already been proposed. In this example, as shown in FIG. 4, there is provided a difference in outer diameters between the splined portion 16a of a shaft 16 and the shaft engaging portion of oil seal means 10 so that protection cap 15 as shown in FIG. 3 is not necessary at the time of assembly since there is no contact at the time of assembly. However, in this case, it is required that either the outer diameter of splined portion 16a of shaft 16 be made smaller than that of the conventional vane type pump as shown in FIGS. 1 to 3, or the outer diameter of the shaft engaging portion of oil seal means 10 be made larger than the conventional one. Therefore, there is caused such other drawbacks that the durability of splined portion 16a is reduced, or, since the dimension of bearing 3 becomes smaller as the outer diameter of the shaft engaging portion of oil seal means 10 becomes larger, the durability of bearing 3 becomes less, etc.

SUMMARY OF THE INVENTION

It is a primary object of the present invention to provide an improved pump means of the type comprising a housing, a disc defining a working chamber in association with the housing and a rotor rotatively received within the working chamber with a number of radial vanes slidably received therein, the housing having a cylindrical inner peripheral surface with an axis eccentric to the center of the rotor, the rotor being adapted to be connected to a shaft of e.g. an automobile alternating current generator, in which the drawbacks as described above inherent in the conventional pump of this type can be all eliminated.

It is another object of the present invention to provide an improved pump means of the type referred to above wherein a protection cap such as has necessary in the conventional pump means at the time of assembly of the pump means and e.g. an automobile alternating current generator is made unnecessary without affecting the durability of the splined portion of the shaft and/or the bearing.

It is a further object of the present invention to provide an improved pump means of the type referred to above wherein the housing, the rotor, and the disc can be previously assembled as a pump proper so that the assembly procedure of the pump means and e.g. an automobile alternating current generator can be simplified.

In accordance with the present invention a pump means is provided wherein a spacer is tightly fitted on the shaft where the oil seal means disposed between the shaft and the disc is adapted to engage the shaft.

In one aspect of the present invention the spacer is tightly fitted on the shaft by shrinkage fitting.

In another aspect of the present invention the spacer is fitted on the shaft with a packing means interposed between the inner surface of the spacer and the shaft to provide a hermetical seal therebetween.

BRIEF DESCRIPTION OF THE DRAWINGS

Other objects and advantages of the present invention will become more readily apparent from the following description taken in connection with the accompanying drawings which set forth by way of illustration and example certain embodiments of the present invention, wherein.

In the drawings, similar or identical parts all bear identical reference numerals throughout the drawings.

DESCRIPTION OF THE PREFERRED EMBODIMENTS

Figure 1:
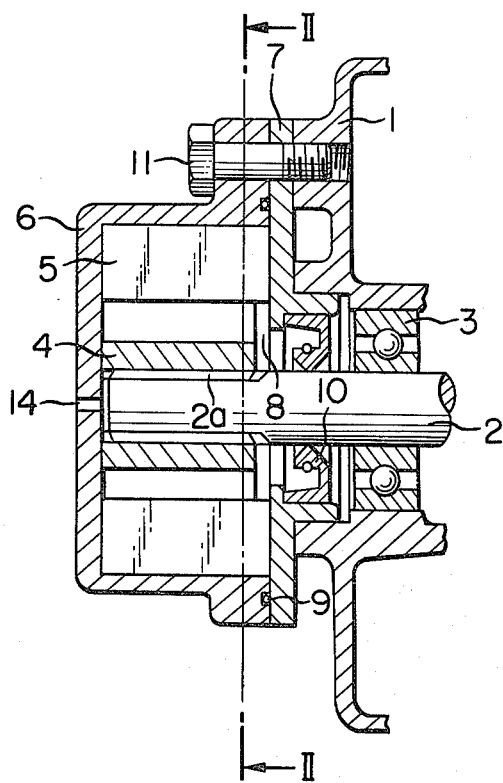
FIG. 1 is a side elevational sectional view of an example of a conventional pump means.
Figure 2:
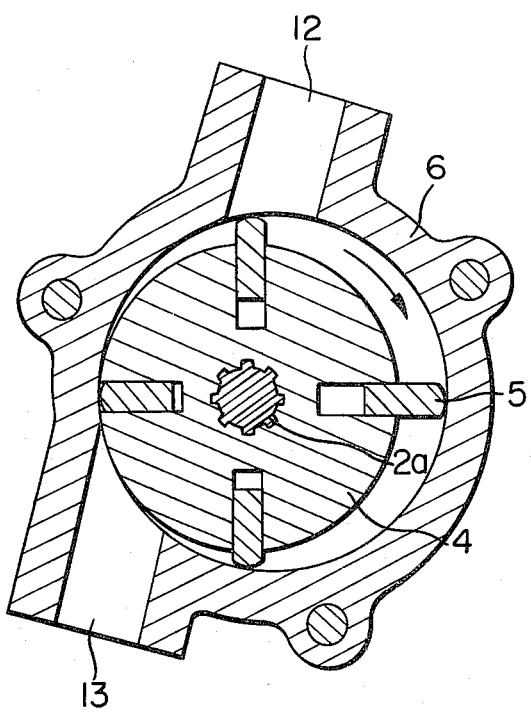
FIG. 2 is a cross sectional view of the pump means shown in FIG. 1 taken along the line II—II of FIG. 1.
Figure 5:
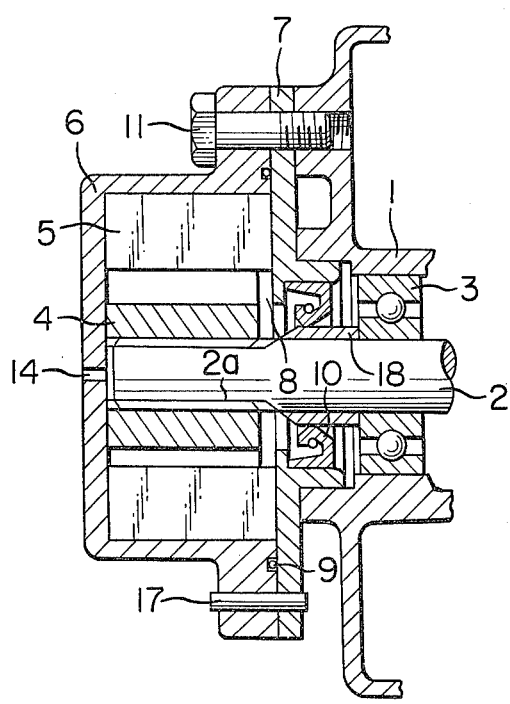
FIG. 5 is a side elevational sectional view of one embodiment of the pump means according to the present invention.

Referring first to FIG. 5 of the attached drawings wherein is shown a first embodiment of the present invention, the reference numeral 17 designates pins to fix housing 6 and disc 7 together to from a pump proper, and 18 designates a spacer tightly fitted with shaft 2 and on the outer peripheral surface of which oil seal means 10 is adapted to be sealingly engaged. At this point it should be noted that the pump means shown in FIG. 5, including other embodiments to be described hereinafter, has a similar construction to that shown in FIGS. 1 to 3 except for the spacer.

Figure 3:
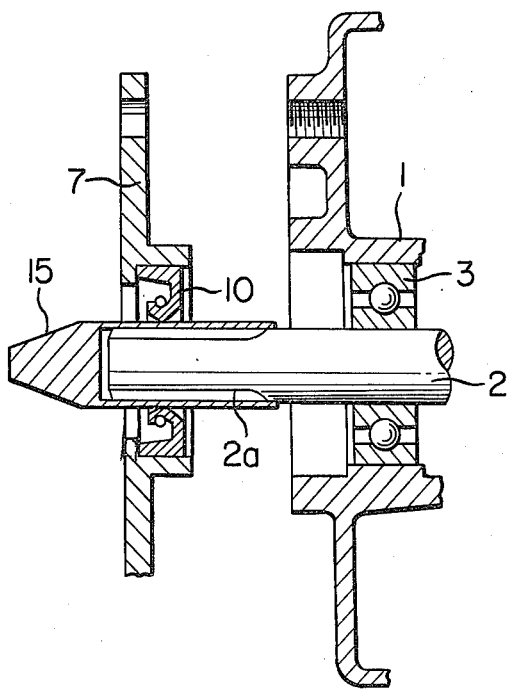
FIG. 3 is a cross sectional view of the pump means shown in FIGS. 1 and 2 showing the state of its principal parts in the course of their assembly.
Figure 4:
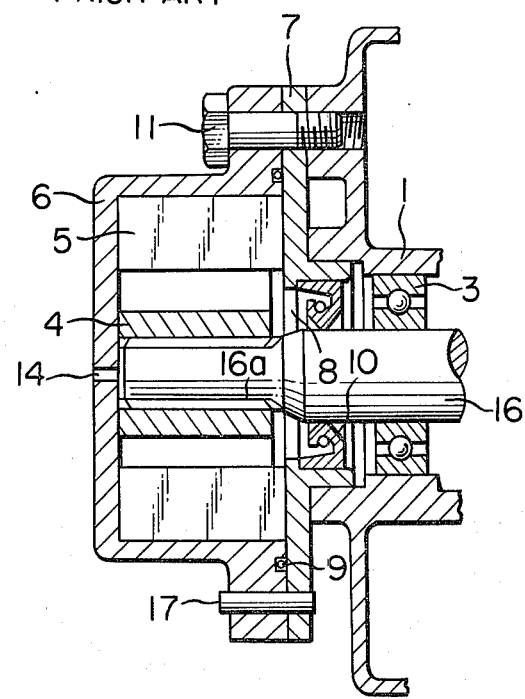
FIG. 4 is a side elevational sectional view of another example of a conventional pump means.

In this first embodiment of the present invention, thanks to the provision of spacer 18 tightly fitted on shaft 2, a protection cap 15 as shown in FIG. 3 is unnecessary at the time of assembly of the pump means and e.g. an automobile alternating current generator, and the dimensions of splined portion 2a of shaft 2 and/or bearing 3 also need not be changed. In other words, the injury of oil seal means 10 by splined portion 2a of shaft 2 at the time of assembly can be prevented by making its inner diameter larger than the outer diameter of splined portion 2a and the necessary seal can be maintained by spacer 18. From this fact, since shaft 2 can be introduced into the splined portion of rotor 4 with housing 6 and disc 7 integrally fixed with pins 17, the assembly of the pump proper and shaft 2 of e.g. an automobile alternating current generator can also be simplified.

It is preferable to make spacer 18 from the same material as that of shaft 2, e.g. carbon steel identified by a notation "S48C", and to tightly fit same on shaft 2 by e.g. shrinkage fitting after subjection to a quenching treatment. Alternatively, spacer 18 may be made of triimid resin, lubricating tetrafluoroethylene resin, etc. Further, spacer 18 can be tightly mounted on shaft 2 by means of a caulking process.

Figure 6:
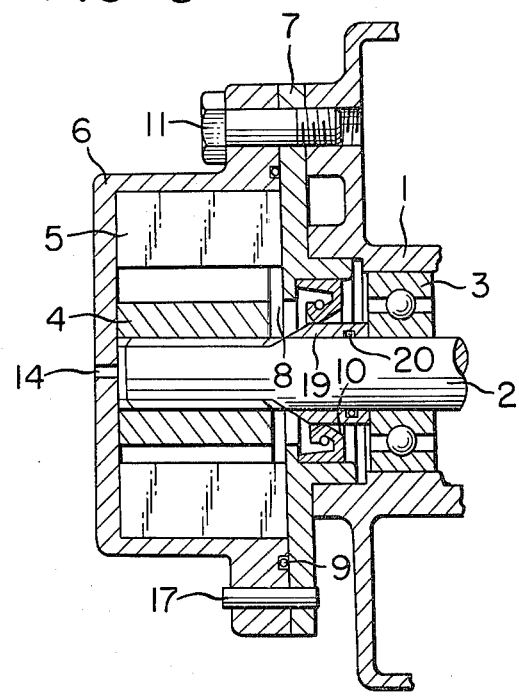
FIG. 6 is a side elevational sectional view of another embodiment of the pump means according to the present invention.
Figure 7:
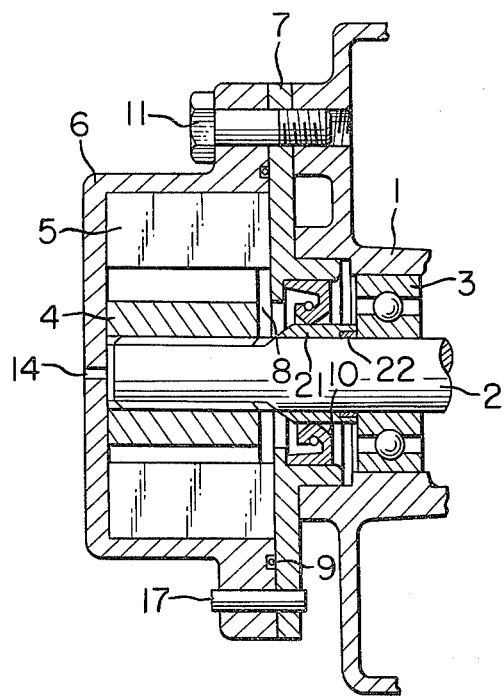
FIG. 7 is a view similar to FIGS. 5 and 6 showing a further embodiment of the present invention.
Figure 8:
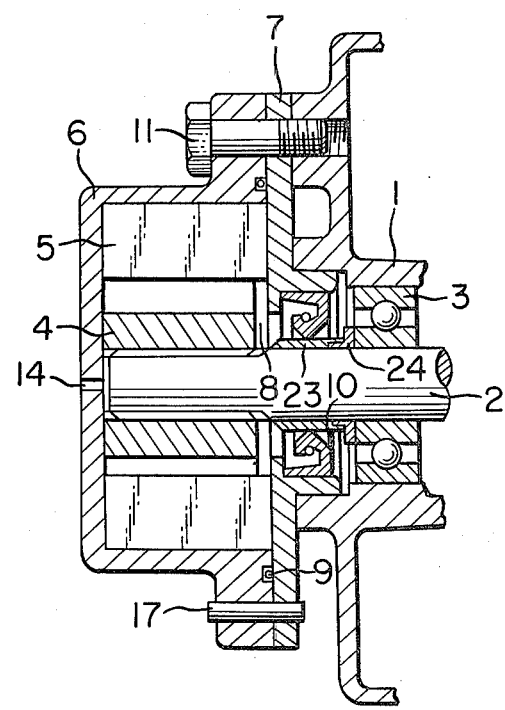
FIG. 8 is a view similar to FIGS. 5 to 7 showing a still further embodiment of the present invention.

Although in the first embodiment spacer 18 has been referred to as being tightly fitted on shaft 2, since this necessitates a precise machining a spacer 18 and shaft 2, respectively, so that they fall within a small dimensional allowance, in order to obviate such a precise machining process other embodiments of the present invention are proposed as shown in FIGS. 6 to 8. That is, in the embodiment shown in FIG. 6 a packing means 20 is interposed between the inner surface of a spacer 19 and shaft 2; in the embodiment shown in FIG. 7 a packing means 22 is interposed between the inner surface of a spacer 21 and shaft 2 and extending to the confronting end surface of bearing 3; and in the embodiment shown in FIG. 8 a packing means 24 is interposed between the inner surface of a spacer 23 and shaft 2 as well as between the confronting surfaces of spacer 23 and bearing 3. Thus, in the embodiments shown in FIGS. 6 to 8, it will be appreciated that even though a precise machining of shaft 2 and spacer 19, 21 or 23 is not required, the air tightness between shaft 2 and spacer 19, 21 or 23 is effectively assured by packing means 20, 21 or 24.

While there have been described and illustrated herein certain embodiments of the present invention, it will be understood that modifications may be made without departing from the spirit of the present invention.

What is claimed is:

1. A pump means comprising:

a cylindrical housing means having a hollow interior open at one end thereof and having an inlet port and an outlet port in the cylindrical wall of said housing;

an annular disc over the open end of said housing means for closing said hollow interior so as to form a working chamber;

a rotor means rotatably mounted within said working chamber with the axis of rotation eccentric to the axis of said working chamber;

vane means radially shiftably mounted on said rotor means and having out edge portions constantly slidably abutting the inner peripheral surface of said housing means for urging fluid from said inlet port to said outlet port;

frame means to which said housing means and said annular disc are fixed;

shaft bearing means on said frame means;

a shaft having a bearing supported portion and rotatably mounted in said bearing means and extending into said working chamber through the center opening of said annular disc means, the portion of said shaft within said working chamber being splined;

said rotor being fixedly mounted on said splined portion of said shaft;

an oil seal means secured at its outer surface of the inner periphery of the center opening of said annular disc means and having an inner diameter larger than the outer diameter of the splined portion of said shaft; and a spacer means tightly fitted on said shaft with the outer periphery sealingly engaging said oil seal means for hermetically sealing said working chamber, said spacer means extending along the length of said shaft only from said splined portion to said bearing supported portion.

2. A pump means as claimed in claim 1 further comprising a packing means in at least part of the joint between said spacer means and said shaft for establishing a hermetic seal between said spacer means and said shaft.

3. A pump means as claimed in claim 2 in which said packing means further extends between said spacer means and said bearing means for establishing a hermetic seal between said spacer means and said bearing means.

* * * * *